(12) United States Patent
Rupp

(10) Patent No.: US 7,531,742 B2
(45) Date of Patent: May 12, 2009

(54) ELECTRICAL JUNCTION BOX

(75) Inventor: Bradford D. Rupp, West Unity, OH (US)

(73) Assignee: Allied Moulded Products, Inc., Bryan, OH (US)

(*) Notice: Subject to any disclaimer, the term of this patent is extended or adjusted under 35 U.S.C. 154(b) by 379 days.

(21) Appl. No.: 11/327,248

(22) Filed: Jan. 6, 2006

(65) Prior Publication Data

US 2006/0194482 A1    Aug. 31, 2006

Related U.S. Application Data

(60) Provisional application No. 60/656,675, filed on Feb. 25, 2005.

(51) Int. Cl.
*H01H 9/02* (2006.01)
(52) U.S. Cl. ............... 174/53; 174/58; 174/481; 174/50; 220/3.2; 220/3.3; 248/906
(58) Field of Classification Search ........ 174/480, 174/481, 50, 53, 57, 58, 491, 503, 61, 62, 174/63; 220/3.2, 3.3, 4.02; 248/906, 343, 248/300
See application file for complete search history.

(56) References Cited

U.S. PATENT DOCUMENTS

| | | | | | |
|---|---|---|---|---|---|
| 4,874,905 | A | * | 10/1989 | Schnell et al. | 174/491 |
| 5,407,088 | A | * | 4/1995 | Jorgensen et al. | 220/3.9 |
| 5,762,223 | A | | 6/1998 | Kerr, Jr. | |
| 6,107,568 | A | * | 8/2000 | Schnell et al. | 174/61 |
| 6,646,201 | B1 | * | 11/2003 | Gretz | 174/58 |
| 6,827,229 | B2 | * | 12/2004 | Dinh et al. | 220/3.3 |
| 6,956,170 | B1 | * | 10/2005 | Gretz et al. | 174/58 |
| 7,009,110 | B1 | * | 3/2006 | Gretz | 174/58 |
| 7,135,640 | B1 | * | 11/2006 | Ofcharsky et al. | 174/58 |
| 7,170,015 | B1 | * | 1/2007 | Roesch et al. | 174/480 |
| 7,306,191 | B1 | * | 12/2007 | Chen | 248/300 |
| 7,307,214 | B1 | * | 12/2007 | Gretz | 174/58 |

* cited by examiner

*Primary Examiner*—Angel R Estrada
(74) *Attorney, Agent, or Firm*—Fraser Clemens Martin & Miller LLC; J. Douglas Miller

(57) ABSTRACT

An electrical junction box is disclosed for hanging a load such as an electrical fixture or a ceiling fan from a ceiling joist, wherein the junction box includes a substantially planar base member and an adjacent compartment for housing electrical leads, wherein the electrical junction box may be firmly attached to the joist.

19 Claims, 5 Drawing Sheets

ELECTRICAL JUNCTION BOX

CROSS REFERENCE TO RELATED APPLICATION

This application claims the benefit of U.S. Provisional Patent Application Ser. No. 60/656,675 filed on Feb. 25, 2005, the disclosure of which is hereby incorporated herein by reference, in its entirety.

FIELD OF THE INVENTION

The present invention relates generally to electrical junction boxes and more particularly to electrical junction boxes adapted to support a load such as an electrical fixture or a ceiling fan, for example, from a supporting structure such as a joist.

BACKGROUND OF THE INVENTION

It often necessary during construction of a structure such as a building to hang or otherwise support a load such as an electrical fixture or ceiling fan. Typically, the load is connected to a joist or other structural component of the building.

Electrical junction boxes may be required for supporting as well as housing electrical wiring and connectors. For heavy fixtures and electrically powered ceiling fans, for example, additional support means may be required to securely support the load. While the prior art junction boxes are deemed to be generally satisfactory, efforts are continuously made to reduce the cost and complexity of the structure and to increase the functionality of the structure.

It would be desirable to produce an electrical junction box which can be readily and securely fastened to a ceiling joist, wherein a complexity and cost of the box are minimized, and a functionality of the box is maximized.

SUMMARY OF THE INVENTION

Consistent and consonant with the present invention, an electrical junction box which can be readily and securely fastened to a ceiling joist, wherein a complexity and cost of the box are minimized, and a functionality of the box is maximized, has surprisingly been discovered.

In one embodiment the electrical junction box comprises a substantially planar base member having an upper surface, a lower surface, and an aperture formed therein for receiving a fastener to secure the base member to a supporting structure, the base member including a pair of spaced apart slots for receiving fasteners for securing a load to the supporting structure; a wall extending upwardly from the upper surface of the base adapted to abut the supporting structure; and an electrical lead receiving compartment extending upwardly from the planar base member, the compartment having a chamber formed therein for receiving electrical leads therein.

In another embodiment the electrical junction box comprises a substantially planar base member having an upper surface, a lower surface, and a pair of apertures formed therein for receiving fasteners to secure the base member to a supporting structure, the base member including a pair of spaced apart slots for receiving fasteners for securing a load to the supporting structure; a wall extending upwardly from the upper surface of the base adapted to abut the supporting structure; and an electrical lead receiving compartment extending upwardly from the base member, the compartment having a chamber formed therein for receiving electrical leads therein, wherein the compartment includes a first side wall extending upwardly from the upper surface of the base member and adapted to abut against the side surface of the supporting structure, a second side wall extending outwardly from the first side wall in a direction opposite the base member and a top wall, the first side wall, the second side wall and the top wall defining the chamber.

In another embodiment the electrical junction box comprises a substantially planar base member having an upper surface, a lower surface, and an aperture formed therein for receiving a fastener to secure the base member to the supporting structure, the base member including a pair of spaced apart slots for receiving fasteners for securing the load to the supporting structure; a protuberant portion formed on the upper surface of the base member, the protuberant portion having an aperture formed therein aligned with the aperture of the base member; at least one wall extending upwardly from the upper surface of the base adapted to abut the supporting structure; and an electrical lead receiving compartment extending upwardly from the base member, the compartment having a chamber formed therein for receiving electrical leads therein, the compartment including a first side wall extending upwardly from the upper surface of the base member and adapted to abut against the side surface of the supporting structure.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed and illustrated, the steps presented are exemplary in nature, and thus, the order of the steps is not necessary or critical.

Figure 1:
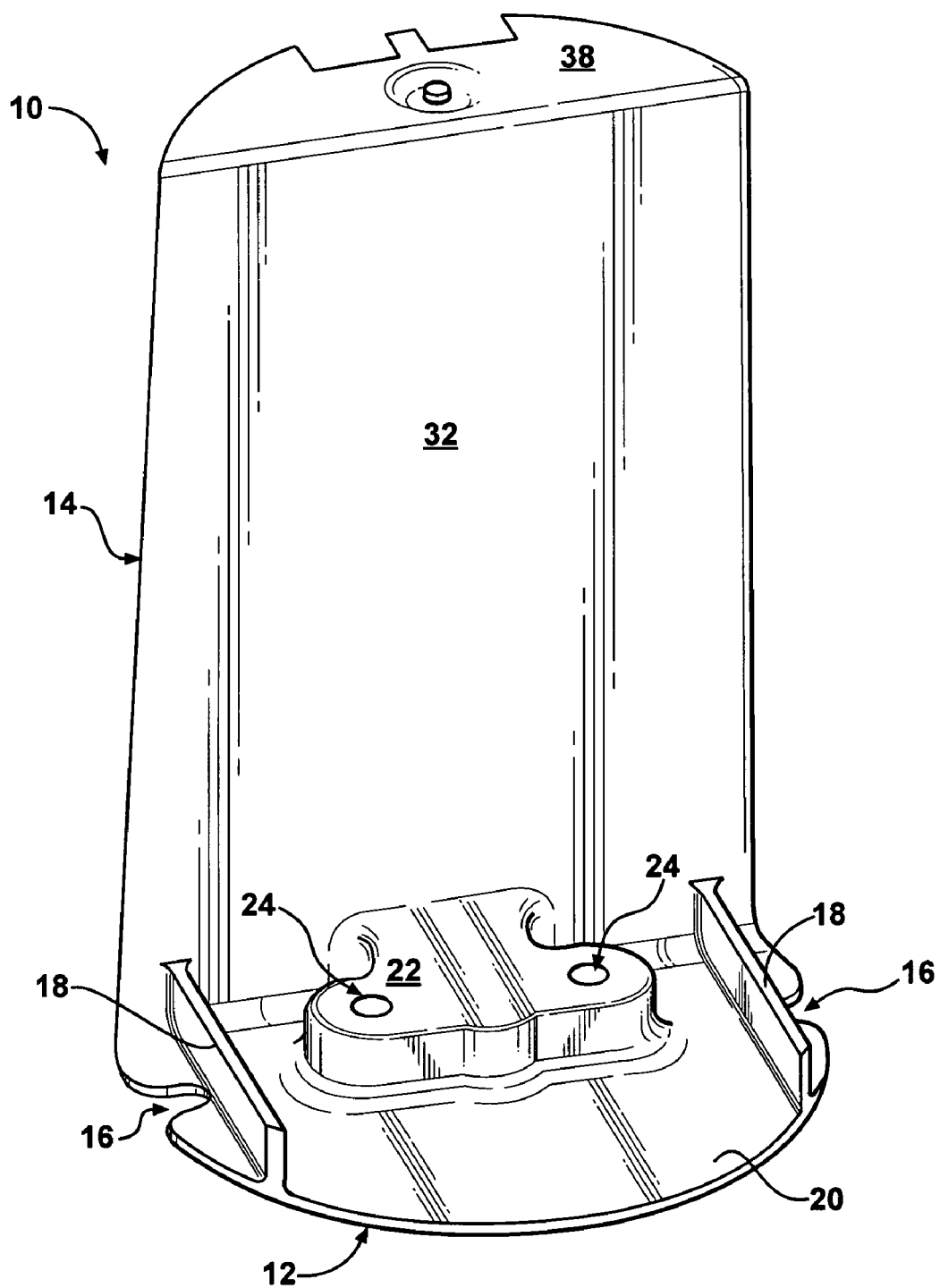
FIG. 1 is a top perspective view of an electrical junction box according to an embodiment of the invention.

FIG. 1 depicts an electrical junction box 10 according to an embodiment of the invention. The electrical junction box 10 includes a substantially flat, planar base member 12 and an upstanding electrical lead receiving compartment 14. In the embodiment shown, the base member 12 and the compartment 14 are formed as an integral structure from a plastic material. It has been found that satisfactory results are achieved by molding the structure from a plastic material such as a non-electrically conductive polymer, for example. However, it is understood that the electrical junction box 10 can be produced from separately produced components and other materials of construction can be used as desired.

In the illustrated embodiment, the base member 12 is relatively thin, or about ⅛ inch thick. However, it is understood that the base member 12 can have a different thickness as desired. The base member 12 includes a pair of slots 16 formed in opposite sides thereof. A slot as defined herein includes an aperture, a hole, an opening, and the like, for example. The slots 16 extend inwardly from a peripheral edge of the base member 12 and are adapted to receive and guide fasteners (not shown) therein. The fasteners secure a load (not shown) to a supporting member such as a joist (not shown). The load can be a ceiling fan or other electrical fixture, for example. A pair of spaced apart upstanding walls 18 extends upwardly from an upper surface 20 of the base member 12. In the embodiment shown, the walls 18 are substantially parallel. However, it is understood that the walls 18 can be arranged otherwise as desired. It is also understood that more or fewer walls 18 can be provided as desired. A protuberant portion 22 is formed on the upper surface 20 of the base member 12. A pair of apertures 24 is formed in the base member 12 and the protuberant portion 22. The apertures 24 are adapted to receive fasteners therein to secure the electrical junction box 10 to a supporting structure such as the joist (not shown), for example. As more clearly shown in FIG. 2, a wiring channel 26 is formed in a bottom surface 28 of the base member 12 between the apertures 24.

Figure 2:
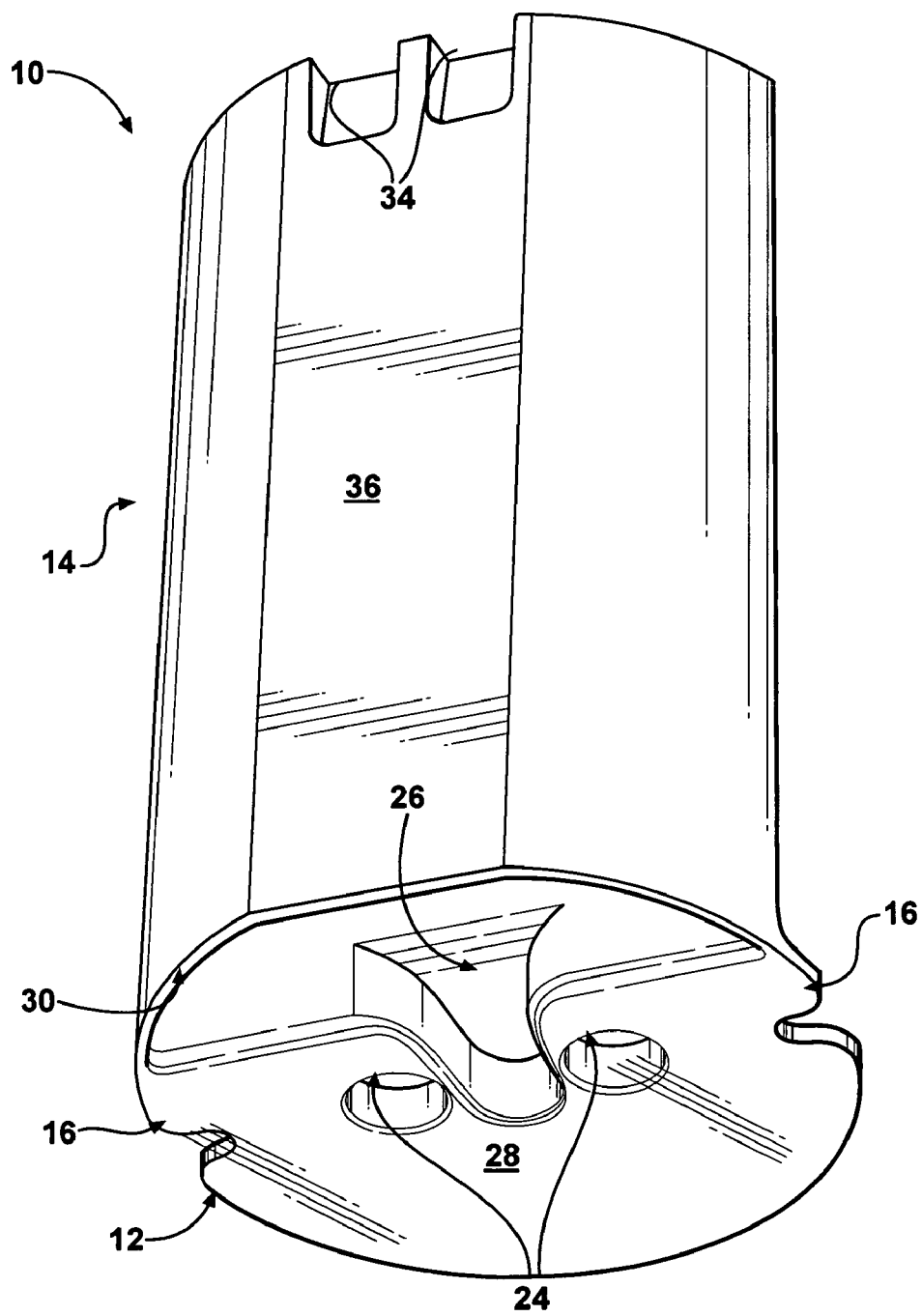
FIG. 2 is a bottom perspective view of the electrical junction box illustrated in FIG. 1.
Figure 3:
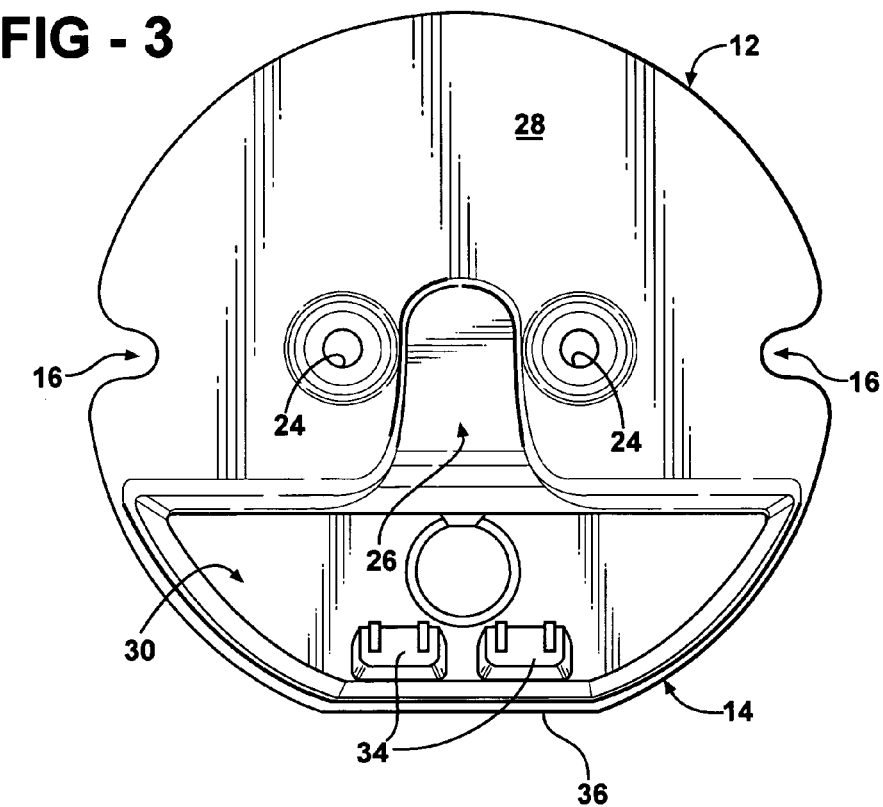
FIG. 3 is a bottom plan view of the electrical junction box illustrated in FIGS. 1 and 2.

The compartment 14 extends upwardly from the upper surface 20 of the base member 12. A chamber 30 is formed in the compartment 14 and is adapted to receive electrical wiring (not shown), electrical connectors (not shown), and the like therein. A first side 32 of the compartment 14 positioned adjacent the upper surface 20 of the base member 12 is substantially planar and is adapted to abut the supporting member. In the embodiment shown, the first side 32 is substantially perpendicular to the base member 12. Knockouts 34 are disposed in a second side 36 of the compartment 14, as illustrated in FIGS. 2 and 3. The knockouts 34 are adapted to be removed to facilitate the entry of the wiring therethrough into the chamber 30. Although two knockouts 34 are shown, more or fewer knockouts 34 can be provided as desired. The chamber 30 is closed on an upper end thereof by a top wall 38. The top wall 38 may also be provided with electrical lead knockouts.

In use, the electrical junction box 10 is particularly suited for supporting heavy loads, such as electrically energized ceiling fans, although other electrical fixtures can be supported therefrom. The electrical junction box 10 can be readily fastened to the supporting structure such as a joist in a stick-built home, for example. While the illustrated embodiment of the electrical junction box 10 is illustrated as being generally a right circular cylinder, it will be understood that the electrical junction box 10 can be produced in other columnar shapes such as a column having a rectangular cross-section, for example.

To install the electrical junction box 10, the walls 18 are caused to abut the underside of the supporting structure and the first side 32 of the compartment 14 is caused to abut a side of the supporting structure. The walls 18 function to add structural strength and rigidity to the base member 12 and also space the upper surface 20 thereof a desired distance from the supporting structure. Once the walls 18 and the first side 32 are in snug engagement with the supporting structure, a suitable threaded fastener (not shown) is positioned in at least one of the apertures 24 and fully driven into the supporting structure.

The load to be supported is disposed beneath the base member 12. The load is connected to the supporting structure by a pair of fasteners (not shown) which extend through the slots 16 of the base member 12. The fasteners are then tightened to secure the load to the supporting structure. It will be understood that appropriate fasteners can be provided with the electrical junction box 10 for securing the load to the electrical lead receiving compartment 14.

Appropriate electrical leads (not shown) from a source of electrical energy are fed through the knockouts 34 and into the chamber 30 of the compartment 14. The leads are joined with appropriate electrical leads from a motor, a light, or other electrical element (not shown) of the load being supported. The wiring channel 26 facilitates connection of the motor, the light, or other electrical element leads with the leads from the source of electrical energy.

Figure 4:
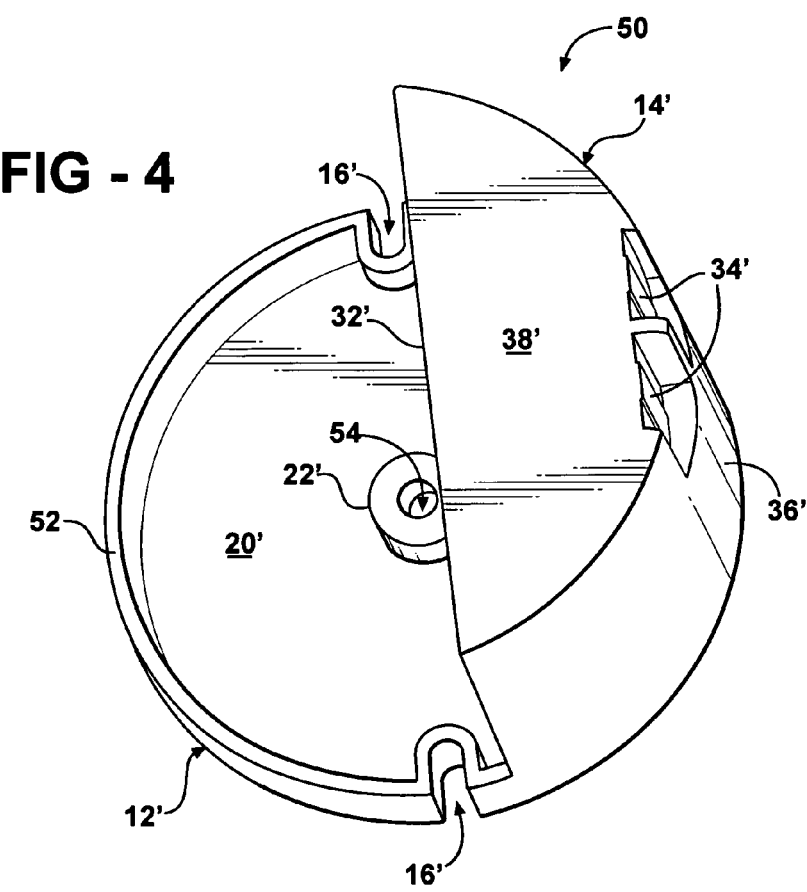
FIG. 4 is a top perspective view of an electrical junction box according to another embodiment of the invention.
Figure 5:
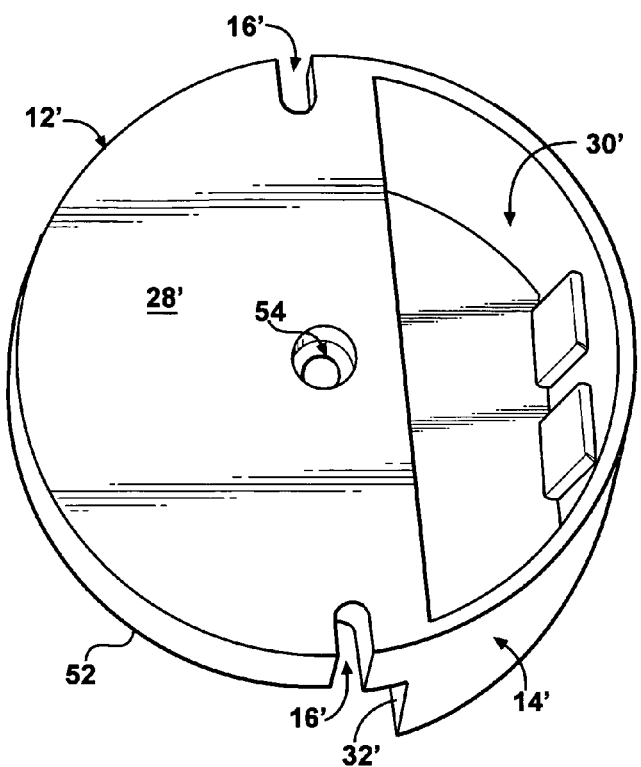
FIG. 5 is a bottom perspective view of the electrical junction box illustrated in FIG. 4.

FIGS. 4 and 5 show another embodiment of the invention, an electrical junction box 50. Repeated structure from FIGS. 1-3 is shown with the same reference numeral and a prime (') symbol for clarity. The base member 12' includes a wall 52 extending upwardly from the upper surface 20' thereof. The wall 52 extends around a periphery of the base member 12' to substantially surround the upper surface 20'. It is understood that intermediate walls could be provided on the upper surface 20' as desired. An aperture 54 is formed in the base member 12' and the protuberant portion 22'. The aperture 54 is adapted to receive a fastener therein to secure the electrical junction box 50 to a supporting structure such as a joist (not shown), for example. The remaining structure of the electrical junction box 50 is substantially the same as described above for FIGS. 1-3.

To install the electrical junction box 50, the wall 52 is caused to abut the underside of the supporting structure and the first side 32' of the compartment 14' is caused to abut a side of the supporting structure. The wall 52 adds structural strength and rigidity to the base member 12' and also spaces the upper surface 20' thereof a desired distance from the supporting structure. Once the wall 52 and the first side 32' are in snug engagement with the supporting structure, a suitable threaded fastener (not shown) is positioned in the aperture 54 and fully driven into the supporting structure. The remainder of the installation can be accomplished as described above for FIGS. 1-3.

Figure 6:
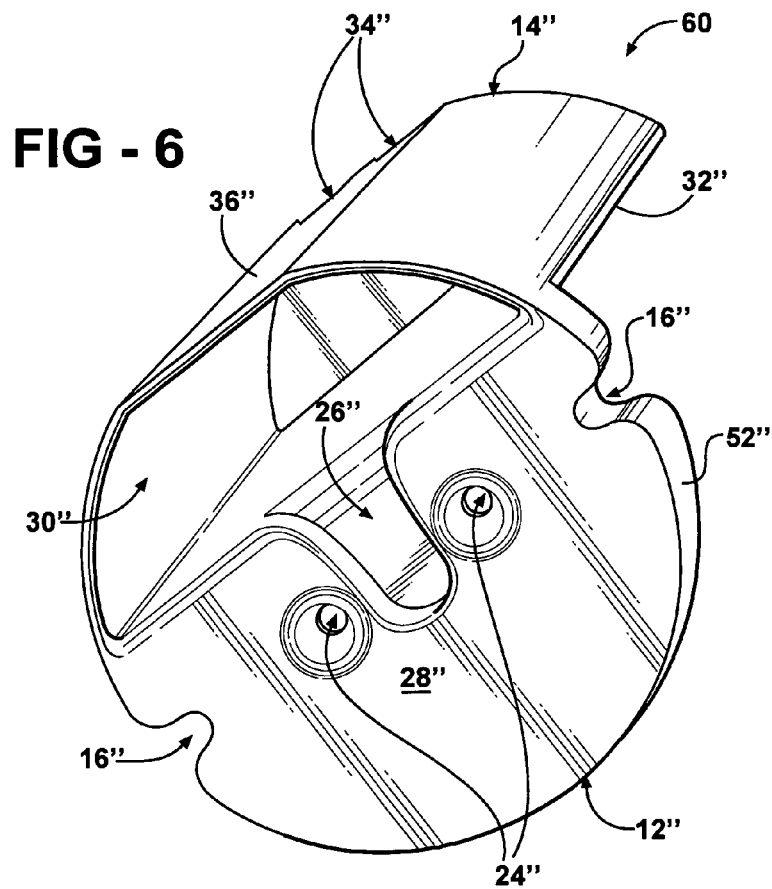
FIG. 6 is a bottom perspective view of another embodiment of the invention showing the electrical junction box illustrated in FIGS. 4 and 5 with a wiring channel formed therein.
Figure 7:
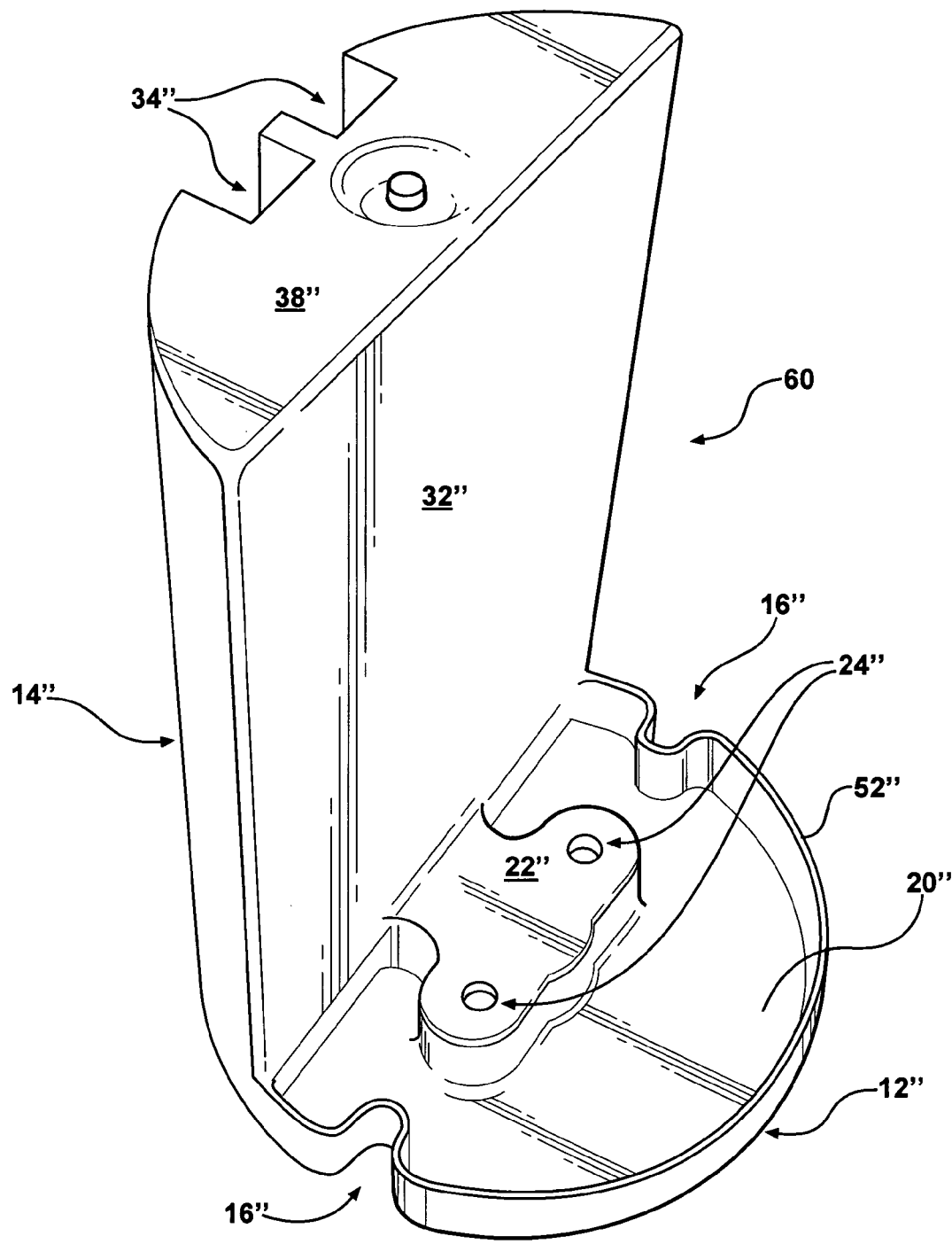
FIG. 7 is a top perspective view of the electrical junction box illustrated in FIG. 6.

FIGS. 6 and 7 illustrate another embodiment of the invention. Repeated structure from FIGS. 1-5 is shown with the same reference numeral and a double prime (") symbol for clarity. The electrical junction box 60 includes a wiring channel 26" formed in a bottom surface 28" of the base member 12" between a pair of apertures 24". The remaining structure is substantially the same as described above for FIGS. 4 and 5.

To install the electrical junction box 60, the wall 52" is caused to abut the underside of the supporting structure and the first side 32" of the compartment 14" is caused to abut a side of the supporting structure. The wall 52" adds structural strength and rigidity to the base member 12" and also spaces the base member 12" a desired distance from the supporting structure. Once the wall 52" and the first side 32" are in snug engagement with the supporting structure, a suitable threaded fastener (not shown) is positioned in at least one of the apertures 24" and fully driven into the supporting structure.

The load to be supported is disposed beneath the base member 12". The load is connected to the supporting structure by a pair of fasteners (not shown) which extend through the slots 16" of the base member 12". The fasteners are then tightened to secure the load to the supporting structure. It will be understood that appropriate fasteners can be provided with the electrical junction box 60 for securing the load to the electrical lead receiving compartment 14".

Appropriate electrical leads (not shown) from a source of electrical energy are fed through the knockouts 34" and into the chamber 30" of the compartment 14". The leads are joined with appropriate electrical leads from a motor, a light, or other electrical element (not shown) of the load being supported. The wiring channel 26" facilitates connection of the motor, the light, or other electrical element leads with the leads from the source of electrical energy.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electrical junction box for hanging a load from a supporting structure having a bottom surface and a side surface, the electrical junction box comprising:
    a base member having an upper surface, a substantially planar lower surface, and an aperture formed therein, said base member including a pair of spaced apart slots adapted to receive fasteners for securing the load to the supporting structure and a pair of apertures formed therein adapted to receive fasteners to secure said base member to the supporting structure;
    a wall extending upwardly from the upper surface of said base adapted to abut the bottom surface of the supporting structure; and
    an electrical lead receiving compartment extending upwardly from the aperture of said base member, said compartment having a chamber formed therein for receiving electrical leads therein, wherein said compartment includes a first side wall extending upwardly from the upper surface of said base member adjacent an edge of the aperture therein, the first sidewall substantially perpendicular to the upper surface of said base member and adapted to abut the side surface of the supporting structure, a second side wall extending upwardly from the upper surface of said base member adjacent the edge of the aperture therein and a top wall, the first side wall, the second side wall and the top wall integrally formed and defining the chamber, wherein said base, said wall, and said compartment are integrally formed.

2. The electrical junction box according to claim 1, further comprising a protuberant portion formed on the upper surface of said base member.

3. The electrical junction box according to claim 1, wherein said base member includes a wiring channel formed in the lower surface thereof.

4. The electrical junction box according to claim 1, further comprising a plurality of knockouts formed in at least one of the second side wall and the top wall of said compartment.

5. The electrical junction box according to claim 1, wherein the wall includes a pair of walls extending upwardly from the upper surface of said base.

6. The electrical junction box according to claim 1, wherein the wall extends upwardly from a peripheral edge of said base member.

7. An electrical junction box for hanging a load from a supporting structure having a bottom surface and a side surface, the electrical junction box comprising:
    a base member having an upper surface, a substantially planar lower surface, and an aperture formed therein;
    a protuberant portion formed on the upper surface of said base member adapted to abut the bottom surface of the supporting structure;
    a wall extending upwardly from the upper surface of said base adapted to abut the bottom surface of the supporting structure; and
    an electrical lead receiving compartment extending upwardly from the aperture of said base member, said compartment having a chamber formed therein for receiving electrical leads therein, wherein said base, said wall, and said compartment are integrally formed.

8. The electrical junction box according to claim 7, wherein said base member includes a wiring channel formed in the lower surface thereof.

9. The electrical junction box according to claim 7, wherein said compartment includes a first side wall extending upwardly from the upper surface of said base member adjacent an edge of the aperture therein and adapted to abut the side surface of the supporting structure.

10. The electrical junction box according to claim 9, wherein the first side wall of said compartment is substantially perpendicular to the upper surface of said base member.

11. The electrical junction box according to claim 7, wherein said compartment includes a second side wall extending upwardly from the upper surface of said base member adjacent the edge of the aperture therein and a top wall, the first side wall, the second side wall and the top wall integrally formed and defining the chamber.

12. The electrical junction box according to claim 11, further comprising a plurality of knockouts formed in at least one of the second side wall and the top wall of said compartment.

13. The electrical junction box according to claim 7, wherein the wall includes a pair of walls extending upwardly from the upper surface of said base.

14. The electrical junction box according to claim 7, wherein the wall extends upwardly from a peripheral edge of said base member.

15. The electrical junction box according to claim 7, wherein said base member includes an aperture formed therein adapted to receive a fastener to secure said base member to the supporting structure and a pair of spaced apart slots adapted to receive fasteners for securing the load to the supporting structure.

16. An electrical junction box for hanging a load from a supporting structure having a bottom surface and a side surface, the electrical junction box comprising:
  a base member having an upper surface, a substantially planar lower surface, and an aperture formed therein, said base member including a pair of spaced apart slots adapted to receive fasteners for securing the load to the supporting structure and at least one aperture formed therein adapted to receive a fastener to secure said base member to the supporting structure;
  a protuberant portion formed on the upper surface of said base member, said protuberant portion having an aperture formed therein aligned with the at least one aperture of said base member;
  at least one wall extending upwardly from the upper surface of said base adapted to abut the bottom surface of the supporting structure;
  an electrical lead receiving compartment extending upwardly from the aperture of said base member, said compartment having a chamber formed therein for receiving electrical leads therein, said compartment including a first side wall extending upwardly from the upper surface of said base member adjacent an edge of the aperture therein and adapted to abut the side surface of the supporting structure.

17. The electrical junction box according to claim 16, wherein said base member includes a wiring channel formed in the lower surface thereof.

18. The electrical junction box according to claim 16, including a pair of walls extending upwardly from the upper surface of said base, wherein said walls are substantially parallel.

19. The electrical junction box according to claim 16, wherein the wall extends upwardly from a peripheral edge of said base member.

* * * * *